(12) United States Patent
Fox et al.

(10) Patent No.: US 7,889,953 B2
(45) Date of Patent: Feb. 15, 2011

(54) SYSTEM AND METHOD FOR MANAGING IMAGES USING PARENT-CHILD RELATIONSHIP

(75) Inventors: Stacey Fox, Round Rock, TX (US); Chandar Kamalanathan, Austin, TX (US); Ching-Lung Tjiong, Austin, TX (US); Esmeralda Traube, Austin, TX (US); Larry McRoberts, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 962 days.

(21) Appl. No.: 11/692,490

(22) Filed: Mar. 28, 2007

(65) Prior Publication Data

US 2008/0244045 A1 Oct. 2, 2008

(51) Int. Cl.
*G06K 9/54* (2006.01)
*G06F 15/00* (2006.01)
*G06F 15/77* (2006.01)

(52) U.S. Cl. .................. 382/305; 358/1.15; 709/220; 715/762

(58) Field of Classification Search ............. 382/232, 382/233, 243, 141, 305, 306, 312; 358/1.15, 358/1.18, 1.6, 1.9; 715/762; 717/174–178, 717/120–121; 707/200; 703/22, 25; 714/31; 709/222, 223, 324, 327, 220
See application file for complete search history.

(56) References Cited

U.S. PATENT DOCUMENTS

| | | | |
|---|---|---|---|
| 5,045,994 A * | 9/1991 | Belfer et al. | 703/25 |
| 6,052,727 A | 4/2000 | Kamalanathan | 709/224 |
| 6,690,830 B1 * | 2/2004 | Cote | 382/232 |
| 6,804,774 B1 | 10/2004 | Larvoire et al. | 713/2 |
| 6,857,059 B2 | 2/2005 | Karpoff et al. | 711/209 |
| 6,928,644 B1 * | 8/2005 | Kroening et al. | 717/175 |
| 7,093,248 B2 | 8/2006 | Kamalanathan et al. | 717/174 |
| 7,143,252 B2 | 11/2006 | Achiwa et al. | 711/162 |
| 7,197,606 B2 | 3/2007 | Kobayashi et al. | 711/147 |
| 7,426,052 B2 * | 9/2008 | Cox et al. | 358/1.15 |
| 2005/0216912 A1 | 9/2005 | Cox et al. | 717/178 |

* cited by examiner

*Primary Examiner*—Kanji Patel
(74) *Attorney, Agent, or Firm*—Hamilton & Terrile, LLP; Gary W. Hamilton

(57) ABSTRACT

A system and method is disclosed for managing disk images used to manufacture information handling machines. In various embodiments of the invention, a disk image is initially created using an image builder server. A "definition," also known as a "manifest," of the image is stored on the image builder server using XML. Once the image is verified and accepted as a base disk image, it is designated as the "parent" image. Subsequently, one or more "children" images are created by copying and modifying the manifest of the parent image and creating a new entry. Predetermined linkage indicators are used to designate the association of the parent image with one or more child images. When the parent image is modified, the linkage indicators are used to propagate corresponding modifications to the associated child images, thereby ensuring coherency in the family of images.

20 Claims, 3 Drawing Sheets

SYSTEM AND METHOD FOR MANAGING IMAGES USING PARENT-CHILD RELATIONSHIP

BACKGROUND OF THE INVENTION

1. Field of the Invention

The present invention relates in general to the field of information handling system manufacture, and more particularly to a system and method for managing disk images used to manufacture information handling systems.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling system users have tremendous flexibility in the hardware and software configurations that they employ to perform various functions. For instance, components having different processing rates, networking modes and storage capacity are often selected to build information handling systems for performing specific functions. In addition, a variety of software applications are configured upon completion of manufacture of information handling systems so that a shipped system arrives ready to perform the intended function. However, one difficulty with the wide variety of available hardware and software configurations is that information handling system users that deploy numerous systems over a period of time often have difficulty maintaining the compatibility of the systems with each other. For this reason, large entities that purchase information handling systems in bulk, such as corporate or government entities, tend to prepare hard disk drive images in advance of the manufacture of ordered systems so that the manufacturer loads the image prior to shipment of the systems. Typically, an information technology administrator of the purchaser configures an exemplary system with a desired software configuration and then sends the hard disk drive or an image of the hard disk drive to the manufacturer to use for manufacturing information handling systems.

After creating a disk image, it is often desirable to reconfigure the image to provide customized features for a particular application. For example, an information systems manager for a corporation may choose to modify a disk image to provide specific language preferences for a particular application or a specialized operating system "desktop" configuration for a group of employees. Heretofore, it has been necessary to manually apply updates and modifications to the original image and to the individual modified versions of the original image. These manual revisions result in added expense for the customer and also increase the likelihood that the modifications are not accurately incorporated into all of the modified versions of the original image.

SUMMARY OF THE INVENTION

As can be seen from the foregoing discussion, a need has arisen for a system and method that provides uniform modification of disk images using a parent-child relationship between the various versions of images.

Embodiments of the present invention provide a system and method wherein an initial image disk comprising an operating system, application software and other data is initially created using an image builder. In some embodiments of the invention, the image builder is hosted on a server accessible by the customer through the Internet. An image library comprises user-defined image components, such as operating systems, base images, and applications, and also includes builder-defined image components associated with the customer, such as files, custom applications, custom settings and previously-ordered images. An image creation engine associated with the image builder server accepts image parameters input remotely by a customer and installs the components associated with the parameters on test information handling systems.

In various embodiments of the invention, a disk image is initially created using the image builder. A "definition" which may also be known as a manifest or "DNA" of the image is stored on an image builder server using XML. Once the image is verified and accepted as a base disk image, it is designated as the "parent" image. Subsequently, one or more "children" images are created by copying and modifying the manifest of the parent image and creating a new entry. Predetermined linkage indicators are used to designate the association of the parent image with one or more child images. When the parent image is modified, the linkage indicators are used to propagate corresponding modifications to the associated child images, thereby ensuring coherency in the family of images.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Embodiments of the invention described herein provide a system and method for managing disk images used to manufacture information handling systems. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
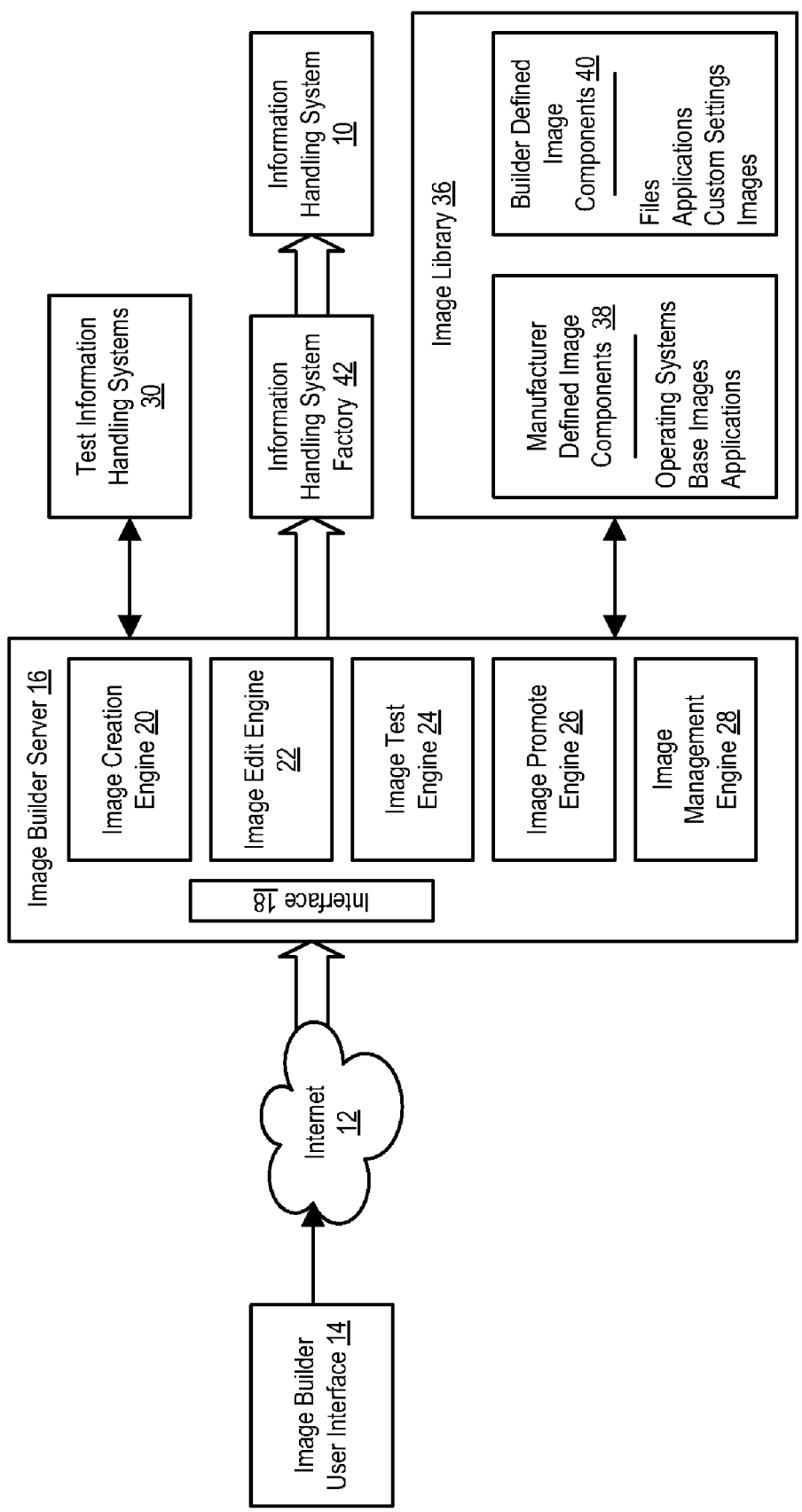
FIG. 1 depicts a block diagram of a system for creating disk images for use in manufacturing of information handling systems.

Referring now to FIG. 1, a block diagram depicts a system for remote building by a customer of an image for use in manufactured information handling systems 10. The customer remotely accesses the manufacturer location through networked communications 12, such as the Internet or an intranet, with an image builder user interface 14. Customer interaction with the manufacturer location is managed through an image builder server 16 having a network interface 18, such as a security subsystem and firewall to restrict unauthorized access. Image builder server 16 presents user interface information formatted for use by a web browser, such as HTML pages.

Image builder server 16 includes a number of functional modules that interact with image build and test information handling systems 30, and an image library 36 within the manufacturer location to create images for use in manufacture of information handling systems 10. An image creation engine 20 accepts image parameters remotely input from the customer with image builder user interface 14 and applies the parameters to image library 36 to assemble image components associated with the parameters to an image build and test information handling system 30. For example, image creation engine 20 allows selection through image builder user interface 14 of manufacturer defined image components 38 or builder defined image components 40. Manufacturer defined image components 38 include operating systems, base images, and applications. The manufacturer defined base images provide a building block approach with a variety of base images having different combinations of commonly selected operating systems and applications for use with commonly used hardware components. Builder defined image components 40 include files, applications, custom settings and images defined for a particular customer, such as images previously developed by the customer. Custom settings for a particular customer include but are not limited to, hard disk drive partition definitions, BIOS settings, network settings, desktop settings, system names, and registry entries.

Once a customer remotely defines image parameters, an image manifest is locally created and stored so that the image can be recreated upon demand. Image creation engine 20 uses the image manifest to select associated components from image library 36 for installation on image build and test information handling systems 30. In embodiments of the invention, the initial images are hardware-independent images comprising native drivers, but no hardware-specific drivers. Image creation engine 20 formats and partitions the hard disk drive, whether hardware or virtual, loads a multi-platform capable base image that includes all appropriate drivers and an operating system. The image creation engine also configures the operating system, loads and configures selected applications, applies network, desktop, user policy, BIOS and other settings and then makes the image available to the user for test. Once build and test information handling system 30's installation and configuration is complete, image creation engine 20 copies the image of the hard disk drive of build and test system 30 to image library 36 as a builder defined image component 40 available for subsequent use in manufacture of an information handling system 10.

Image builder server 16 includes an image edit engine that supports editing of base images to adapt to desired changes input through image builder user interface 14. For instance, a customer may build a new image for use in manufacture by editing a manufacturer base image or previously built customer image stored in image library, such as is disclosed by U.S. patent application Ser. No. 10/317,871, entitled "Platform Independent Imaging Method and System" filed on Dec. 12, 2002, and incorporated herein by reference. An image test engine 24 incorporated in image builder server 16 interfaces with test information handling systems 30 to allow remote test commands of information handling systems having a selected image loaded. An image promotion engine 26 allows a customer to promote a selected image to an information handling system factory manufacturing environment 42 to manufacture information handling systems 10 with the image. An image management engine 28 allows a customer to manage the builder defined image components 40 within image library 36, such as allowing uploading of customer-specific files, applications and settings for inclusion in images and saving or deleting previously created images.

In some instances, a customer will modify the initial base or "parent" image to create one or more related "child" images. For example, an information systems manager may want to modify the parent image to provide a child image having essential the same overall content, but with a different set of desktop icons or with a different set of printer options.

Figure 2:
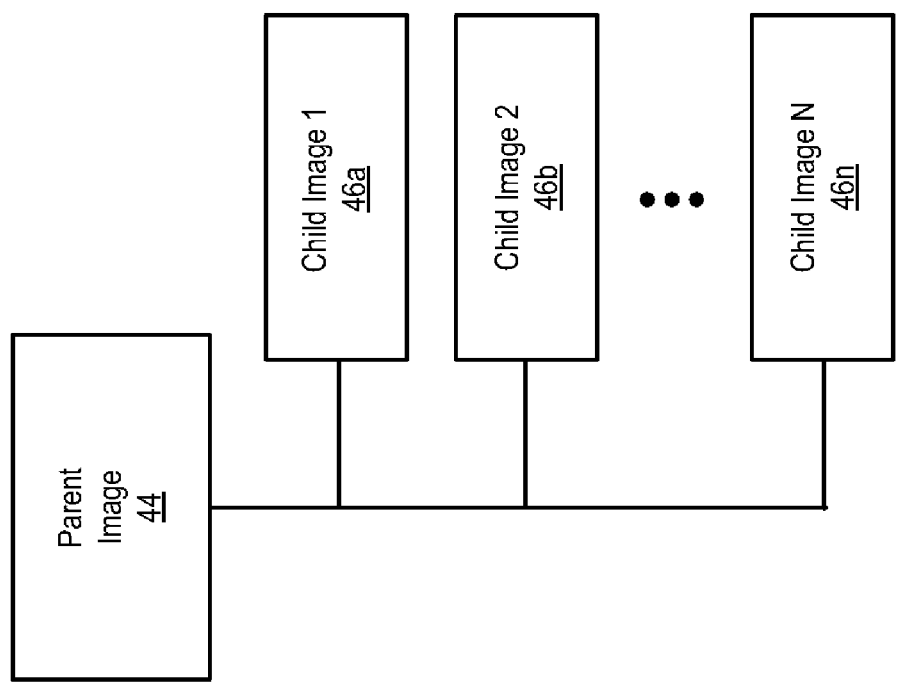
FIG. 2 shows the relationship between a parent image and a child image in accordance with embodiments of the present invention.
Figure 3:
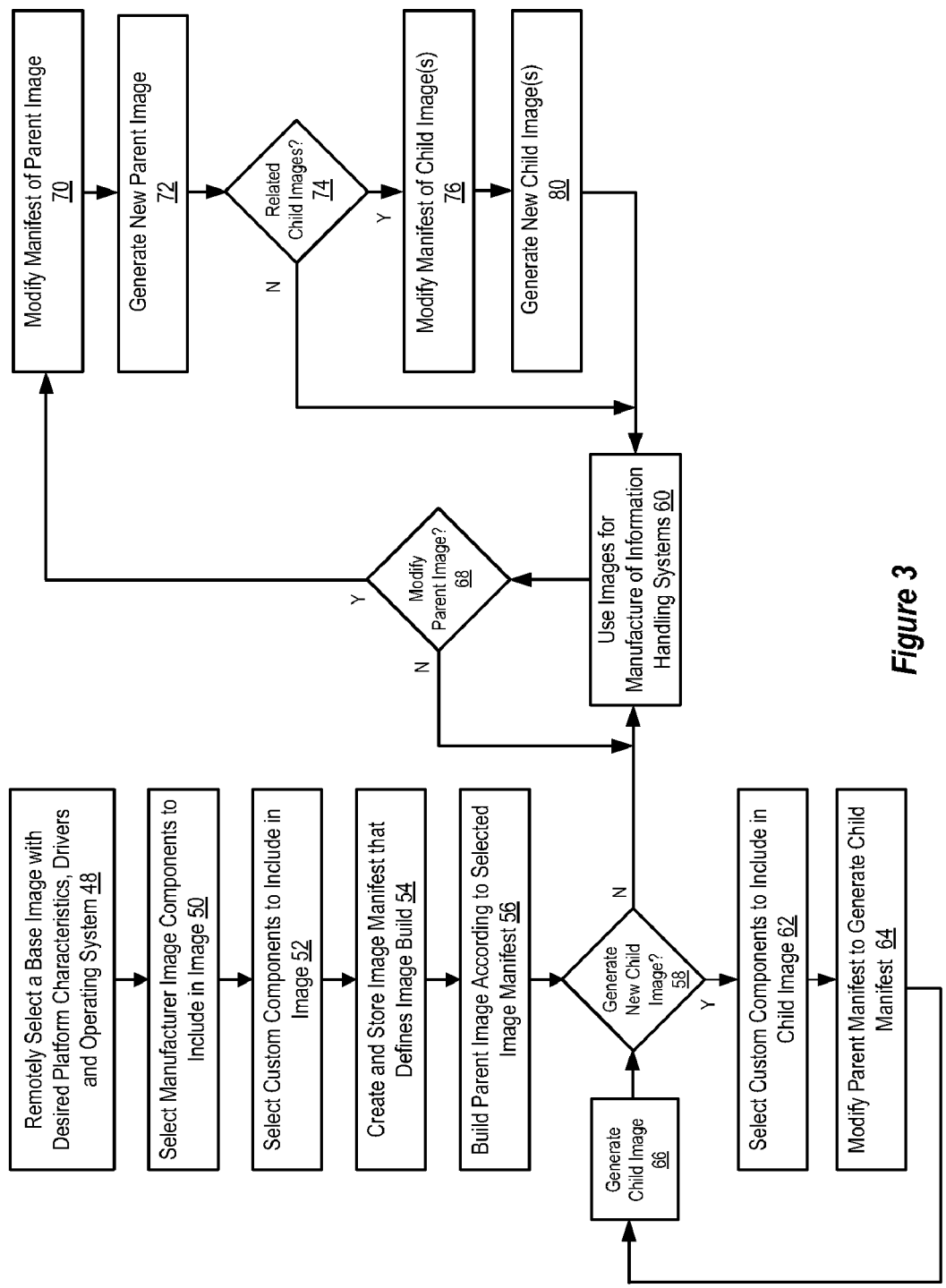
FIG. 3 depicts a flow diagram of a process for managing disk images using a parent-child relationship between the disk images.

FIG. 2 is an illustration of a parent image 44 and a plurality of associated child images 46a, b, . . . , n. In various embodiments of the invention, a disk image is initially created using the image builder described hereinabove. A "definition" or "manifest" of the image is stored on an image builder server using XML. Once the image is verified and accepted as a base disk image, it is designated as the "parent" image. Subsequently, one or more "children" images are created by copying and modifying the manifest of the parent image, thereby providing modified functionality for a particular application or operating environment.

In previous systems, updates and modifications of a family of images has required cumbersome manual modification of all parent and child manifests. In embodiments of the present invention, predetermined linkage indicators are used to designate the association of the parent image with one or more child images. When the parent image is modified, the linkage indicators are used to propagate corresponding modifications to files used to build the associated child images, thereby ensuring coherency of the individual images in the family of images.

In an embodiment of the invention, the parent manifest can be implemented using XML commands similar to the following:

---

<RequestJob xmlns:xsd="http://www.w3.org/2001/XMLSchema"
xmlns:xsi="http://www.w3.org/2001/XMLSchema-instance" MODEL="GX50"
GUID="WW5A9C6C-2FAB-4336-811B-F1D6679B6851" JobID="356" JobType="1"

-continued

```
ParentID="356">
<OS OSID ="2" Name ="Microsoft
Windows XP SP1" Path="dell/os/winxpro.pqi"
Link=1 />
<ChildNode>
<Node id="357" />
<Node id="359" />
</ChildNode>
</RequestJob>
```

In the XML commands listed above, the ParentID, e.g., "356" is linked with two "ChildNodes" designated by Node IDs 357 and 359. The "Link=1" designator indicates that the parent is linked to the two child nodes. If, however, the "Link" designator had been "Link=0", this would indicate that the parent is not linked to the two child nodes.

The manifests of the child images can be implemented using XML commands similar to those in the following example:

```
<RequestJob xmlns:xsd="http://www.w3.org/2001/XMLSchema"
xmlns:xsi="http://www.w3.org/2001/XMLSchema-
instance" MODEL="GX50"
GUID="WW5A9C6C-2FAB-4336-811B-F1D6679B6851" JobID="359"
JobType="1"
ParentID="356">
<OS OSID ="2" Name ="Microsoft Windows XP
SP1" Path="dell/os/winxpro.pqi"
Link=1 />
</RequestJob>
```

In the XML commands listed above, the child manifest is identified by "JobID=359" and the "ParentID=356" designator indicates the corresponding parent manifest. The "Link=1" designator indicates that the child is linked to the parent manifest. If, however, the "Link" designator had been "Link=0", this would indicate that the child manifest is not linked to the parent manifest.

Referring now to FIG. 2, a flow diagram depicts a process for remote building of an information handling system image and for subsequently managing updates and modifications to such images. The process begins at step 48 with the remote selection of a base image having the desired platform characteristics, drivers, operating system, and other data files. At step 50, the manufacturer components are selected for inclusion in the image, and at step 52, the custom components are selected for inclusion in the image. Once all of the base image, manufacturer components and custom components are remotely selected, at step 54 an image manifest is created and stored on local storage. An image wizard accepts remotely inputted parameters from the customer for defining the image, such as hard disk drive partitions, power management, network setup, desktop setup, BIOS setup, and customer policies. The image manifest defines the image build components and the build process without requiring an image to be built and saved, thus reducing the storage space needed and allowing subsequent editing of the image manifest to define modifications to the image. At step 54, the image is built according to the image manifest by creating the image on a local hard disk drive according to the definitions set forth in the image manifest. At step 56, the built image is provided to the factory for manufacture of information handling systems that have the built image copied to their hard disk drives. For instance, the built image is communicated by an FTP transfer to a factory server or, alternatively, copied to one or more optical media, such as CD or DVD optical media readable by manufactured information handling systems.

In step 58, a decision is made regarding the creation of child images. If no child images are created, processing proceeds to step 60 and the parent manifest is used to manufacture information handling systems. If, however, a child image is to be created, processing proceeds to step 62 where custom components are selected for incorporation into the child image. In step 64, a copy of the parent manifest is modified to create the manifest for the child image and the child image is then generated in step 66. Processing then returns to step 58, where a decision made regarding the creation of another child image. If additional child images are to be created, steps 62, 64, and 66 are repeated; otherwise, processing proceeds to step 60 where the parent and child images are used to manufacture information processing systems.

In step 68, a decision is made regarding the modification of the parent image. If the parent image is not modified, processing returns to step 60 and the existing parent (and child) images are used to manufacture information handling systems. If, however, there is a decision to modify the parent image, processing proceeds to step 70 where the parent manifest is modified and is used, in step 72, to generate a new parent image. In step 74 the system determines whether there are any child images that are associated with the modified parent image. If there are no associated child images, processing returns to step 60 and the modified parent image is used to manufacture the information handling system. If however, it is determined that there are related child images, processing proceeds to step 76 wherein the manifest(s) of the associated child image(s) are modified by propagating the corresponding modifications made to the parent manifest into the respective child manifests. The modified child image(s) are created in step 80. Processing then proceeds to step 60 where the modified parent and child images are used to manufacture information handling systems.

Although the present invention has been described in detail, it should be understood that various changes, substitutions and alterations can be made hereto without departing from the spirit and scope of the invention as defined by the appended claims.

What is claimed is:

1. A system for managing disk images for the manufacture of information handling systems, the system comprising:
   an interface operable to accept disk image parameters from a builder;
   an image library having plural image components;
   an image creation engine operable to apply the image parameters to select associated image components from the image library to build a parent image conforming with the parameters;
   at least one test information handling system interfaced with the image creation engine and operable to accept the library components to generate an information handling system having the built image; and
   processing logic operable to associate said parent image with one or more child images whereby modifications to the content of said parent image are detected and corresponding modifications are automatically incorporated into said child images.

2. The system of claim 1 wherein the parent image and said child images are generated using manifests comprising XML commands.

3. The system of claim 2 wherein a manifest for said parent image comprises a link identifier designating an association between said parent image and a predetermined child image.

4. The system of claim 2 wherein a manifest for a child image comprises a link identifier designating an association between said child image and a predetermined parent image.

5. The system of claim 4 wherein the manufacturer defined image components comprise one or more operating systems.

6. The system of claim 4 wherein the builder defined image components comprise one or more of builder-uploaded files, applications, and custom settings.

7. The system of claim 6 wherein the builder defined custom settings comprise hard disk drive partitions, BIOS settings, network settings, desktop settings, system names and registry entries.

8. The system of claim 1 further comprising an image test engine operable to accept test commands communicated through the Internet and to apply the test commands to the image build and test systems.

9. The system of claim 1 further comprising an image promotion engine operable to communicate a copy of the built image to an information handling system manufacturing site for manufacture of information handling systems having the built image.

10. The system of claim 1 further comprising an image management engine operable to accept builder defined image components through the Internet and to copy the builder defined image components to the image library.

11. A method for managing disk images for the manufacture of information handling systems, the method comprising:
 accessing a library of plural image components;
 selecting image components for inclusion in manufactured information handling systems;
 defining an image manifest with the selected components;
 building a parent image from the image; and
 associating said parent image with one or more child images, whereby modifications to the content of said parent image are detected and corresponding modifications are automatically incorporated into said child images.

12. The method of claim 11 further comprising using a manifest comprising XML commands to generate said parent image and said child images.

13. The method of claim 11 wherein a manifest for said parent image comprises a link identifier designating an association between said parent image and a predetermined child image.

14. The method of claim 13 wherein a manifest for a child image comprises a link identifier designating an association between said child image and a predetermined parent image.

15. The method of claim 13 wherein the test information handling system comprises a virtual information handling system modeled in network-accessible memory.

16. The method of claim 11 further comprising:
 uploading to the image library from the customer through the remote network communications one or more custom image components; and
 including the custom image components in the image manifests.

17. The method of claim 16 wherein the custom image components comprise one or more custom applications operable to perform a desired function on a manufactured information handling system.

18. The method of claim 16 wherein the custom image components comprise custom information handling system settings.

19. The method of claim 18 wherein the custom information handling system settings comprise one or more hard disk drive partitions, BIOS settings, network settings, desktop settings, system names and registry entries.

20. The method of claim 11 further comprising:
 storing the built image in the library; and
 creating a new image by editing the stored built image.

* * * * *